United States Patent [19]

Butterfield et al.

[11] 3,850,501

[45] Nov. 26, 1974

[54] FEEDTHROUGH ELECTRICAL TERMINAL FOR HOLLOW LIQUID COOLED SHAFT OF A DYNAMOELECTRIC MACHINE

[75] Inventors: John L. Butterfield; James L. Wenzel, both of Erie, Pa.

[73] Assignee: General Electric Company, Wilmington, Mass.

[22] Filed: Apr. 9, 1973

[21] Appl. No.: 349,056

[52] U.S. Cl............ 339/263 R, 339/94 A, 339/215
[51] Int. Cl............................ H01r 7/08, H01r 7/02
[58] Field of Search .......... 174/135; 339/94 A, 111, 339/214, 215, 263, 267, 112

[56] References Cited
UNITED STATES PATENTS

| | | | |
|---|---|---|---|
| 371,161 | 10/1887 | Adams | 339/215 R X |
| 2,245,918 | 6/1941 | Hobbs | 339/214 R X |
| 2,682,570 | 6/1954 | Elliott | 339/94 A UX |
| 2,716,737 | 8/1955 | Maberry | 339/111 X |
| 2,949,551 | 8/1960 | Sturgeon | 174/153 UX |
| 3,213,685 | 10/1965 | Mannherz et al. | 174/153 X |

*Primary Examiner*—Roy D. Frazier
*Assistant Examiner*—Lawrence J. Staab

[57] ABSTRACT

The subject matter of this invention is a leakproof feedthrough electrical terminal for bringing leads out from the interior of a liquid cooled hollow shaft. The novel feedthrough terminal includes a lower female terminal member which has a cylindrical, internally threaded portion positioned in an insulating bushing located in an opening in the shaft wall. The cylinder has a tapered shoulder which cooperates with the bushing to provide positive sealing against leakage of the cooling liquid. An upper male terminal member has an externally threaded stud to engage the internally threaded lower cylinder and also includes a second threaded stud which projects beyond the shaft wall to receive a terminal lug. When the threaded stud of the upper terminal engages the internally threaded cylinder, the entire lower terminal moves upwardly and the tapered shoulder exerts a wedging action on the insulating bushing forcing it outward against the wall of the opening in the shaft thereby sealing the hole and preventing leakage of the cooling liquid. Consequently, the feedthrough terminal provides a liquid seal without use of potting compounds, is of separable construction so that the terminal is easily assembled and disassembled thereby making maintenance and repair of the components located in the hollow shaft simpler and less time consuming.

4 Claims, 3 Drawing Figures

FEEDTHROUGH ELECTRICAL TERMINAL FOR HOLLOW LIQUID COOLED SHAFT OF A DYNAMOELECTRIC MACHINE

This invention relates to an electrical connector, and more particularly, for a feedthrough terminal for bringing the electrical leads from components positioned in a hollow liquid cooled shaft of a dynamoelectric machine to the outside of the shaft.

The use of hollow, liquid cooled shafts in dynamoelectric machines [such as high speed aircraft generators; synchronous motors which use brushless exciters to provide DC excitation of the rotor] is well known and offers many advantages both from the standpoint of facilitating cooling and to permit mounting of certain rotating electrical components such as rectifiers inside of the shaft. When an electrical component such as a rectifier is mounted in the hollow shaft, it is obvious that some provision must be made to bring electrical leads from the component into and out of the shaft. Typically, this done by drilling a number of openings in the wall of the shaft and mounting an insulated terminal in the opening. The leads are then connected to oppposite ends of the terminal to provide the desired connection between the interior and exterior of the shaft. Since the interior of the shaft is filled with a cooling liquid such as oil, leakage of oil through the openings in the shaft must be prevented. The customary and accepted method is to use potting compounds, both in the opening as well as at the point where the terminal projects beyond the outside of the shaft wall, in order to seal the feedthrough terminal and prevent oil leakage. The use of potting compound, however, can cause numerous problems both from the standpoint of the effectiveness of the seal and also from the standpoint of maintenance and repair. That is, the use of potting compound for sealing purposes is often a far from an effective solution. For example, if the dynamoelectric machine is operated in a high temperature environment [a condition quite common in high speed machines for aircraft applications], severe problems can arise in maintaining a leakproof feedthrough terminal. One such problem comes about because it is difficult to match the temperature coefficients of expansion of the potting compound to that of the metal shaft and the metallic components mounted on the shaft. Consequently, they expand at different rates and the resulting stresses on the potting compounds due to these differential thermal expansion characteristics often cause the potting compound to crack so that oil leaks through the cracks. The problem is aggravated if high speed machines, which are typical in aircraft usage, are involved, since the high speeds result in a pumping action so that a great deal of oil can be pumped out of the shaft through cracks in the potting compound used to seal the terminals.

In addition to the leakage problem so common with the potting approach, there are other shortcomings which can be quite troublesome and costly. In the first place, the potting operation is slow, messy and difficult thereby increasing the time, complexity and cost involved in fabricating the device. Furthermore, once the potting compound is cured, the electrical connectionsare buried under hard potting which is very difficult to remove, making repair and maintenance operations for such dynamoelectric machines difficult.

Hitherto, feedthrough terminals were usually of a one-piece or unitary construction. In many applications this was not objectionable and presented no difficulties. However, in aircraft applications, for example, where space is at a premium, the rotating components are often crowded closely together and the installation of one piece feedthrough terminals from the outside of the hollow shaft could therefore result in difficult assembly problems.

Consequently, a need exists for a feedthrough electrical terminal which provides a good seal against oil leakage, is simple in construction, and is separable so that it may be easily assembled and disassembled to facilitate both rapid and easy initial assembly and any subsequent repair and maintenance of the electrical components contained in the shaft.

It is therefore a primary objective of the instant invention to provide a feedthrough electrical terminal for a liquid cooled hollow shaft which is liquid tight at the point the terminal projects through the shaft.

Another objective of the invention is to provide a separable electrical feedthrough terminal for an oil filled hollow shaft which is simple in construction, and easily assembled and disassembled.

A further objective of the invention is to provide a separable feedthrough terminal for an oil filled hollow shaft in which the terminal may be easily disassembled to provide ready access to the electrical components in the shaft for ease of repair and maintenance.

Yet another objective of the invention is to provide a separable multielement feedthrough electrical terminal for an oil filled hollow shaft with a good low resistance current conducting path through the terminal.

Other advantages and objectives of the invention will become apparent as a description thereof proceeds.

Broadly speaking, the arrangement for providing a separable feedthrough terminal for a hollow, oil filled shaft contemplates an assembly in which an internally threaded female cylindrical terminal element is mounted in a bushing positioned in a passage in the shaft wall. A male terminal element has a pair of threaded studs, one of which is screwed into the internally threaded cylindrical terminal element and the other of which projects outside of the exterior of the shaft. The cylindrical terminal element has a tapered shoulder so that tightening of the two terminal elements causes the shoulder to exert wedging action against the bushing forcing it firmly against the wall of the passage thereby sealing it and preventing oil leakage. An oil tight construction is thus achieved without using potting or other sealing compounds, while at the same time, the terminal may be easily disassembled to facilitate removal of electrical components positioned within the hollow oil filled shaft of a dynamoelectric machine.

The novel features which are believed to be characterstic of this invention are set forth with particularity in the appended claims. The invention itself, however, both as to its organization and mode of operation, together with further objectives and advantages, may best be understood by reference to the following description taken in connection with the accompanying drawings in which:

Figure 1:
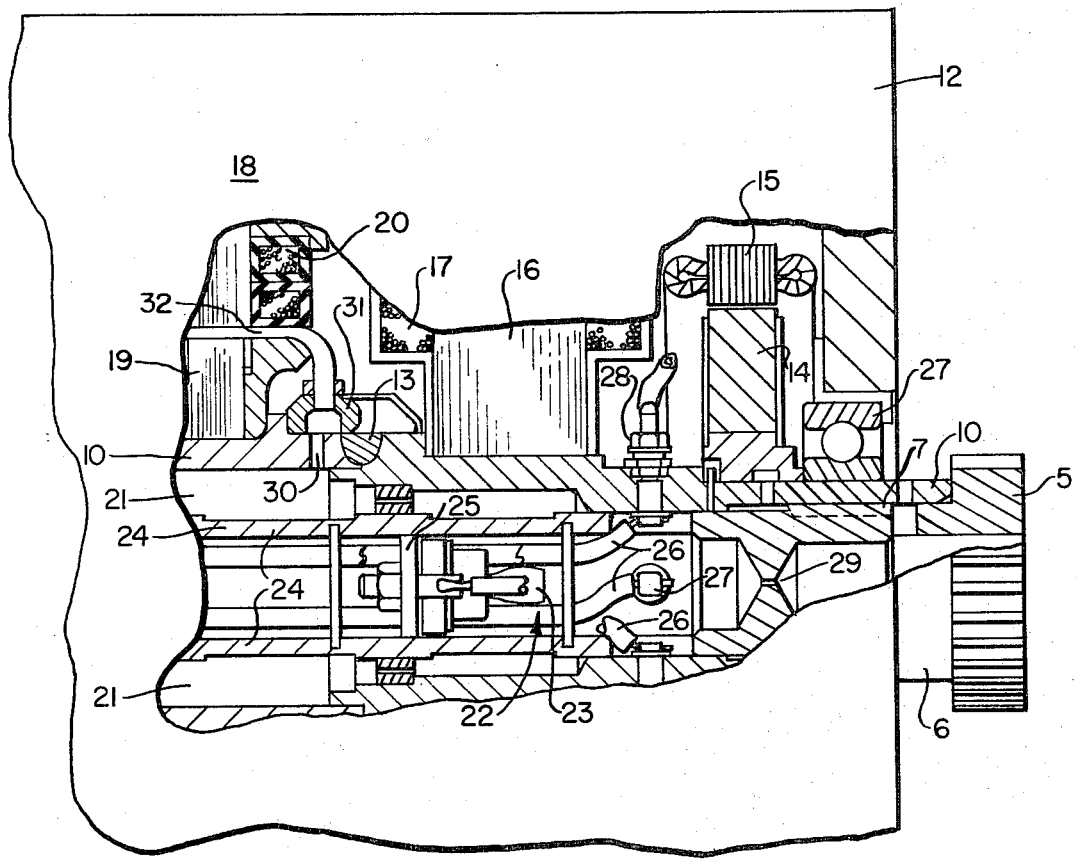
FIG. 1 is a partially broken away elevational view of a dynamoelectric machine including the novel feedthrough terminal.

In the drawing of FIG. 1, the invention will be described in connection with an aircraft generator mounted on a hollow shaft 10 which is driven by an aircraft engine, not shown, through the geared end 5 of a stub shaft 6. It will be understood, however, that the invention is not limited to dynamoelectric machines useful in aircraft but is equally applicable to any machine which utilizes a liquid cooled hollow shaft having electrical components mounted therein. Stub shaft 6 has an externally splined portion 7 which engages corresponding internal splines in hollow generator shaft 10. Shaft 10, which is supported for rotation in frictionless roller bearings 11 secured in housing 12, consist of two machined steel portions that are welded together at 13 to form a unitary structure. A permanent magnet generator (PMG) rotor 14 is mounted at one end of shaft 10 and reacts electrodynamically with stator and stator windings 15 to generate a voltage which after suitable rectification, supplies the field excitation for a brushless exciter which is also mounted on shaft 10. The exciter, which is only partially shown, includes a laminated armature 16 which supports a plurality of armature windings 17. A three-phase alternating voltage produced in the exciter armature windings is applied to a plurality of rotating rectifiers mounted within the hollow shaft to produce the direct current field excitation for a generator 18 mounted on shaft 10. The generator includes a laminated generator rotor core 19, only partially shown in FIG. 1 which supports rotor windings 20. Field excitation for rotor windings 20 is provided by the rectified exciter voltage and a suitable output voltage is generated in the armature windings, not shown, of generator 18.

Shaft 10 which supports the PMG, the exciter and generator is, as pointed out previously, hollow, and has an interior cavity 21 through which cooling oil is pumped. Mounted in the cavity is a rotating rectifier assembly shown generally at 22 which contains a plurality of rectifiers 23, only one of which is shown. The rectifiers are fastened to a pair of rectifier support rails 24 which support the discs 25 to which the rectifiers are secured. A plurality of leads 26 are connected to the anode and cathode electrodes of the rectifiers and are brought out of the shaft through a plurality of radial terminal passages 27 which hold the separable feedthrough terminal assemblies 28 which are the subject of the instant invention.

The number of rectifier leads which must be brought out of the shaft, and hence, the number of terminals depends on the number of phases of the exciter voltage, i.e., single phase, three-phase, six-phase, etc., and the rectifier circuit configuration, i.e., full wave or half-wave with one rectifier per phase being required for half-wave rectification and two rectifiers per phase for full wave rectification. Thus, for example, in a three-phase, half-wave rectifier assembly, i.e., where one rectifier is provided per phase to rectify one alternation of each cycle of the AC exciter voltage, it will be apparent that four leads must be brought out from the hollow shaft. That is, three input leads from the exciter windings are brought into the shaft and connected to the anodes of the rectifiers and a common output lead from cathodes of the rectifiers is brought out of the shaft to apply the unidirectional field excitation to the generator. Thus, for a three-phase, half-rectified brushless exciter four-terminal, passages 27 are drilled through the shaft wall and four feedthrough terminals 28 extend through these passages.

Shaft 10, as pointed out previously, is oil filled in order to provide cooling for rectifiers 23 with the cooling oil being supplied by pump or other source of supply not shown. The oil in cavity 21 is also used to cool the generator rotor core 19 and is brought out of the cavity by a plurality of oil return passages 30 which communicate with a manifold 31 which surrounds shaft 10. A plurality of oil carrying cooling pipes 32 only one of which is shown, extend axially through generator rotor 19 and recirculates the oil back to the pump while simultaneously cooling the generator rotor. Some of the oil in the shaft is also utilized to lubricate driving gear 5 which is part of a gear train in a gearbox, not shown, through metering vent 29 which communicates between the interior of stub shaft 6 and shaft 10.

It will be apparent from the description of the overall assembly that in bringing leads 26 to the exterior of the shaft, oil must be prevented from leaking past the terminals located in passages 27. At the same time, the terminal should be so constructed that repair or maintenance of the rectifiers inside of the hollow shaft is facilitated; i.e., it should be possible to disassemble the feedthrough terminal and to remove the rectifier assembly from the interior of the shaft without first clipping or unsoldering the leads from the terminal. The feedthrough terminal of the instant invention is therefore, of a separable construction so that upon disassembly, the lower portion of the terminal drops through the radial terminal passages into the shaft cavity. This makes it possible to remove the entire rectifier support assembly including the rectifiers, leads, and the lower portion of the terminal intact from the interior of the shaft for repair or maintenance.

Figure 2:
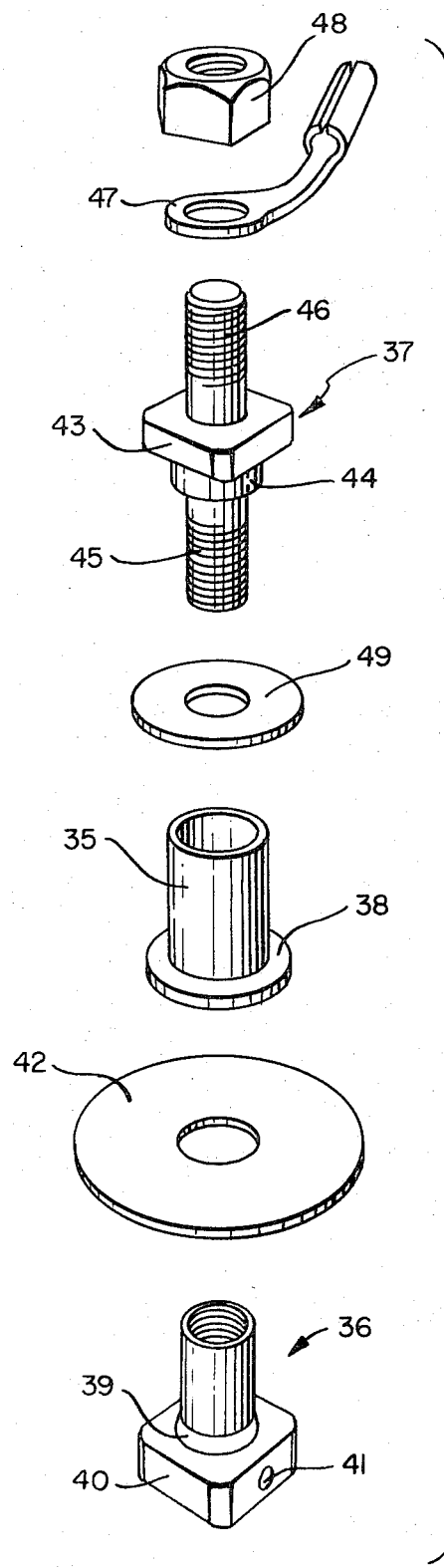
FIG. 2 is an exploded, perspective view of the feedthrough terminal assembly.

FIG. 2 illustrates in exploded form the novel feedthrough terminal construction which provides all of these desirable characteristics, namely:

a. an oil tight seal to prevent loss of oil through the terminal passages.

b. ease of disassembly to permit removal of the entire rectifier support assembly including the leads attached to a portion of the terminal to facilitate repair and maintenance, and c. good current conduction and good electrical characteristics even with the separable construction.

The separable feedthrough terminal with all of these desirable characteristics basically includes a cylindrical insulating bushing 35, a lower internally threaded female terminal member 36 and an upper externally threaded male terminal member 37. Bushing 35 may be formed of any suitable insulating material and one such material is a polyimide powder [commercially available from the EI duPont de Nemours Co. of Wilmington, Delaware under their trade designation Vespel], which is sintered under heat and pressure into a rigid generally cylindrical bushing. Insulating bushing 35 fits into terminal passages 27 and has a flange 38 at its lower end to ensure that the bushing cannot be pulled through the passages. The bushing provides insulation between the conductive elements of the feedthrough terminal and shaft 10.

Internally threaded lower terminal member 36 includes the means for sealing the terminal against oil leakage by closing off the passages in the shaft wall when the terminal is fully assembled. Terminal member 36 is positioned in bushing 35 and includes a tapered shoulder 39 at the base of the cylinder which expands the bushing when the terminal is assembled thereby sealing the terminal passage against oil leakage. Terminal element 36 has base 40 which includes a passage 41 for receiving the rectifier leads. The rectifier leads are positioned in passage 41 and are then soldered to secure the leads firmly to the base of the terminal. A thin insulating washer 42 fabricated of a suitable insulating material, one example of which is a very thin polyimide film, positioned between base 40 of the lower terminal and the interior wall of the shaft. The outer diameter of the insulating washer is larger than the maximum dimension of base 40 to prevent flashover between base 40 and the interior wall of the generator shaft. Insulating washer 42 is provided in addition to the insulating bushing 35 to provide additional protection against shorting of the terminal to the shaft wall. Polyimide films are commercially available in various sizes and thickness from E I duPont de Nemours Co. of Wilmington, Delaware under their trade designation "Kapton."

The lower terminal 36, the insulating bushing 35 and the insulating washer 42 are components of the feedthrough terminal which are mounted from the interior of the shaft whereas the remaining portion of the terminal presently to be described, is inserted from the exterior of the shaft. It will be seen, therefore, that whenever the feedthrough terminal is disassembled, the portion of the terminal to which the rectifier leads are attached may simply be removed from the interior of the shaft with rectifier leads still attached thereby facilitating disassembly of the device with great ease since the leads need not be removed from the terminal either by cutting or unsoldering before removing the rectifier assembly from the shaft. This, of course, simplifies repair and maintenance of the device since the entire rectifier assembly may be removed, checked, or repaired and then reinserted in the shaft and the terminal reassembled.

Male terminal member 37 of feedthrough terminal 28 has a rectangular base 43, a cylindrical shoulder 44 projecting from the lower side of base 43 and a pair of externally threaded terminal studs 45 and 46. Lower stud 45 screws into the internally threaded member 36 and upper terminal stud 46 extends above the outer wall of the shaft. The upper stud 46 receives a lug 47 which is secured to the terminal by a locknut 48. An insulation fiber washer 49 is positioned between base 43 and the shaft thereby insulating the upper terminal from shaft 10. Shoulder 44 is designed to engage the upper rim 50 of the hollow, internally threaded cylinder forming part of lower terminal 37 to provide a good current conducting path between the upper and lower terminal members thereby ensuring that current flow takes place here rather than across the screw threads which constitute a much higher resistance path.

Figure 3:
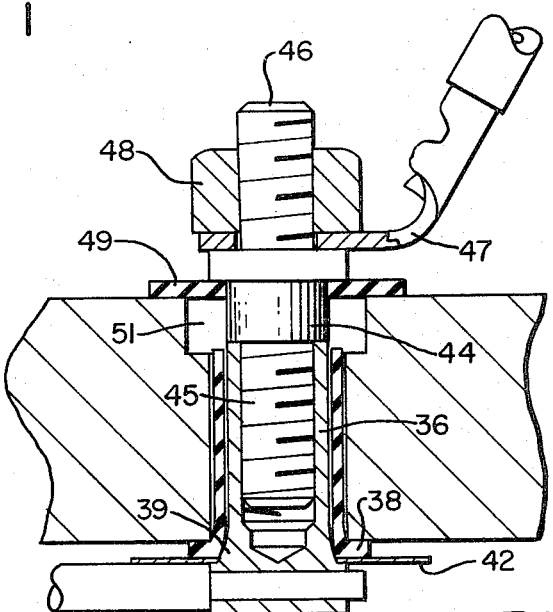
FIG. 3 is a sectional view taken along the lines 3—3 of FIG. 1 and shows the assembled feedthrough terminal.

FIG. 3 shows the feedthrough terminal in the assembled state. Thus, when assembled, the internally threaded lower terminal 36 is positioned within the insulating bushing 35 with flange 38 of the insulating bushing resting firmly against the interior wall of shaft 10. Insulating washer 42 is positioned between the flange of insulating bushing 35 and the base 40 of the lower terminal and extends beyond the base of the terminal thereby preventing flashover between the base and the interior wall of the shaft. The threaded stud 45 of the upper terminal member is screwed into the internally threaded portion of the lower terminal and when so attached, moves the lower terminal member upward causing tapered shoulder 39 to wedge the lower end of bushing 35 outward forcing it against the wall of terminal passage 27 thereby sealing the hole against oil leakage.

Cylindrical shoulder 44 of the upper terminal portion is positioned in a counter bore 51 in shaft wall 10. The counter bore is provided to prevent flashover between the shaft and the terminal in the area where insulating bushing 35 does not cover the terminal. That is, as may be seen in FIG. 3, bushing 35 is shorter than the cylindrical portion of lower terminal element 36 so that the metallic cylinder projects beyond insulating bushing 35. This is done to insure that good current carrying contact is made between shoulder 44 and rim 50 of the lower terminal portion, i.e., that the bushing does not interfere with this contact. The counter bore increases the distance between the projecting metallic cylinder and in effect provides an insulating air gap which prevents flashover to the shaft wall.

In assembling feedthrough terminal 28, leads 24 are first positioned in passage 41 of base 40 and are secured thereto by soldering. The insulating washer 42 is then slipped over the lower terminal and the lower terminal is positioned in insulating bushing 35. This assembly is then placed and held in terminal passage 27 from the interior of the shaft. The upper terminal portion 37 is then attached to the lower terminal by slipping the washer 49 between base 43 and the upper surface of shaft 10 which has a flat, not shown, ground in the vicinity of the terminal passages so that the fiber washer and base 43 are seated firmly against the shaft. Stud 45 is inserted into the internally threaded lower terminal to tighten the terminal assembly. The threaded stud 45 may, if desired, be treated by a thread locking compound such as "Loctite" prior to assembly to facilitate locking, although this is not absolutely necessary. As threaded stud 45 is screwed into the lower terminal, the lower terminal is pulled upward forcing tapered shoulder 39 axially in the upward direction. As this occurs, the tapered shoulder wedges the lower portion of inslating bushing 35 outward and seats it firmly against the interior wall of terminal passage 27 thereby producing an oil tight seal and preventing leakage of oil through the terminal holes.

After the upper terminal portion 37 has been tightened, terminal lug 47 to which the exterior leads are fastened, is placed over upper terminal stud 46 and a locknut 48 firmly secures lug 47 to the terminal. It can be seen that upon disassembly, locknut 48 and lug 47 are first removed. Then upper terminal portion 37 is rotated to loosen the screw threads until the two terminal elements separate, causing the lower part to release and drop downward into the interior of the shaft. The entire rectifier assembly including the lower terminal can thus be removed intact for whatever repair or maintenance needs to be done without first having to clip or unsolder the rectifier leads. Thereafter, the rectifier assembly is reinserted into the shaft and the feedthrough terminal reassembled.

It will be apparent from the above description that a feedthrough terminal for a rotating shaft has been described which makes it possible to provide an electrical connection between electrical components such as the rotating rectifiers for a burshless exciter, positioned inside of a shaft to the exterior of the shaft, while at the same time, preventing leakage of oil from the shaft. Furthermore, the terminal is easily disassembled thereby making maintenance and repair of the interiorly mounted components a simple matter.

Consequently, a feedthrough assembly has been described which is simple in construction, easy to manufacture and install and highly effective in operation.

While a particular embodiment of the invention has been illustrated and described, it will be apparent that various modifications thereof may obviously be made in the various instrumentalities and arrangements described without departing from the true spirit and scope of the invention as defined in the appended claims.

What is new and desired to be secured by Letters Patent of the United States is:

1. In a separable, feedthrough, electrical terminal for a hollow liquid filled shaft, the combination comprising:
   a. a liquid filled, hollow shaft,
   b. a passage means through the wall of the shaft,
   c. a cylindrical, insulating, bushing member positioned in said passage means,
   d. a female terminal member positioned in said bushing and having a portion projecting into the interior of said hollow shaft and adapted to have a lead means connected thereto, the remaining portion of said female terminal member extending partially into the interior of said bushing,
   e. a male terminal member adapted to engage said female member and having a portion projecting outside of the shaft wall and adapted to have a lead means connected thereto,
   f. said female terminal member having a tapered shoulder portion which also extends partially into the interior of said bushing to exert a wedging action on said bushing when said male and female members are engaged thereby forcing at least a portion of said bushing outwardly against the wall of said passage to prevent leakage of the liquid out of said shaft.

2. The feedthrough terminal according to claim 1 wherein said female member is internally threaded and said male member has an externally threaded member which engages the internally threaded female member.

3. The feedthrough terminal according to claim 2 wherein said female member comprises a cylindrical portion, the interior of which is threaded and the male member includes an externally threaded stud which engages the internally threaded cylinder.

4. The feedthrough terminal according to claim 3 wherein said male member has a shoulder and an externally threaded portion projecting therefrom, said male member engaging the rim of the cylindrical portion of said female member to insure current transfer across the rim and the shoulder rather than across the threaded portions of said male and female members.

* * * * *